J. B. SMITH.

Improvement in Coffee Pots.

No. 124,454.    Patented March 12, 1872.

WITNESS:
William Hornor
a.e. May

INVENTOR.
J. B. Smith

UNITED STATES PATENT OFFICE.

J. B. SMITH, OF MILWAUKEE, WISCONSIN, ASSIGNOR TO GEORGE R. CHITTENDEN, OF CHICAGO, ILLINOIS.

IMPROVEMENT IN COFFEE-POTS.

Specification forming part of Letters Patent No. 124,454, dated March 12, 1872; antedated February 28, 1872.

*To all whom it may concern:*

Be it known that I, J. B. SMITH, of the city and county of Milwaukee and State of Wisconsin, have invented a new and useful Improvement in Coffee-Pots; and I do hereby declare that the following is a full, clear, and exact description thereof, which will enable those skilled in the art to make and use the same, reference being had to the accompanying drawing forming part of this specification, in which—

Figure 1:
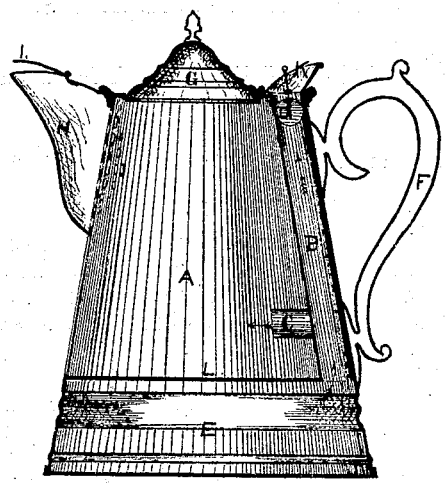
Figure 2:
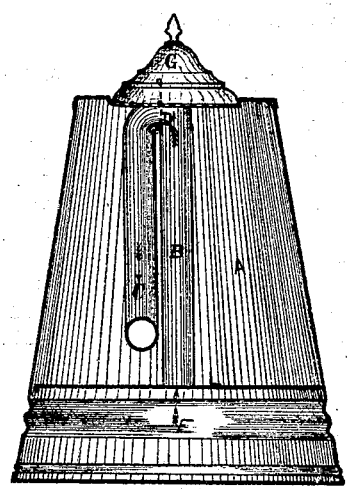

Figure 1 is a vertical side sectional view, and Fig. 2 a front sectional view.

Similar letters of reference in each of the figures indicate corresponding parts.

The object of my invention is to produce a coffee-pot which will make coffee in an expeditious manner, and without boiling.

A is the outside of the coffee-pot; B, the water and steam tube; C, the steam-tube, by which the steam from the boiling water shall pass down into the coffee-pot and under the surface of the coffee and be condensed; D, valve with which to open and close the tubes B and C alternately; E, the water-space in the bottom of the coffee-pot; F, handle of the coffee-pot; G, cover of the coffee-pot; H, spout; I, cover to the spout; K, shield to prevent the steam from the water from burning the hand; L, partition between the water-receptacle in the bottom of the coffee-pot and the coffee or tea receptacle above, forming a tight partition, in which tube B is inserted.

Operation.

Put coffee or tea into the receptacle above partition L and pour upon it sufficient water; then place the valve D, which is a swing-valve, upright, as shown in Fig. 1, and pour in hot water enough to fill the space E and tube B about half full; then press down the handle of valve D, as shown in Fig. 2, so that the valve shall open the orifice into tube C and close the top of tube B, and set the pot on the stove; as the water boils in E the steam will pass up tube B and down C under the coffee in the pot and be condensed, and thus the tea or coffee will be cooked without boiling.

Claim.

What I claim as my invention is—

A coffee or tea-pot, when made with tubes B and C, and valves D and water-space E, substantially as described.

J. B. SMITH.

Witnesses:
 A. C. MAY,
 WILLIAM HORNOR.